US006467172B1

(12) United States Patent
Jenq

(10) Patent No.: US 6,467,172 B1
(45) Date of Patent: Oct. 22, 2002

(54) PLASTIC PIPE CUTTING DEVICE

(76) Inventor: Shin-Tong Jenq, No. 8, Lane 341, Tucheng Rd., Tali City, Taichung County (TW)

( * ) Notice: Subject to any disclaimer, the term of this patent is extended or adjusted under 35 U.S.C. 154(b) by 208 days.

(21) Appl. No.: 09/666,305

(22) Filed: Sep. 21, 2000

(51) Int. Cl.[7] .......... B23D 21/10
(52) U.S. Cl. .......... 30/92; 30/243; 30/272.1
(58) Field of Search .......... 30/92, 99, 108, 30/272.1, 241, 245, 246, 243; 83/628, 629, 54, 178, 181, 182, 183, 188; 74/84 R, 120

(56) References Cited

U.S. PATENT DOCUMENTS

| | | | | | |
|---|---|---|---|---|---|
| 4,176,450 | A | * | 12/1979 | Muromoto | 30/92 |
| 4,312,127 | A | * | 1/1982 | Tanaka | 30/92 |
| 4,936,177 | A | * | 6/1990 | Ozawa et al. | 83/628 X |
| 5,018,275 | A | * | 5/1991 | Huang | 30/92 |
| 5,046,250 | A | * | 9/1991 | Huang | 30/92 |
| 5,129,158 | A | * | 7/1992 | Campagna | 30/92 |
| 5,218,765 | A | * | 6/1993 | Huang | 30/92 |
| 5,718,051 | A | * | 2/1998 | Huang | 30/92 X |
| 5,862,593 | A | * | 1/1999 | Huang | 30/92 |
| 5,924,201 | A | * | 7/1999 | Wang | 30/92 |
| 6,098,291 | A | * | 8/2000 | Wang | 30/92 |

* cited by examiner

*Primary Examiner*—Charles Goodman
(74) *Attorney, Agent, or Firm*—Rosenberg, Klein & Lee

(57) ABSTRACT

A plastic pipe cutting device includes a housing, a cutter connected to a tensile spring at a rear side in the housing and adapted for cutting a plastic pipe inserted into the housing, a lever pivoted to the housing and adapted to drive the cutter, a driving block supported on a spring in the lever and adapted for turning with the lever to move the cutter forwards, a stop member adapted to stop the cutter from backward movement, and a push block slidably mounted in the housing and adapted to push the stop member away from the cutter for enabling the cutter to be automatically pulled back by the tensile spring to its stand-by position after the loaded plastic pipe had been cut.

2 Claims, 5 Drawing Sheets

PLASTIC PIPE CUTTING DEVICE

BACKGROUND OF THE INVENTION

The present invention relates to a plastic pipe cutting device adapted for cutting plastic pipes and, more particularly to such a plastic pipe cutting device, which automatically pulls the cutter back to the stand-by position after each cutting operation.

A conventional plastic pipe cutting device, as shown in FIG. 1, is generally comprised of a housing 1, a cutter holder 5 slidably mounted in the housing 1, the cutter holder 5 having a bottom rack 7 and a side rod 8, a cutter 6 fixedly mounted on the front side of the cutter holder 5, a tensile spring 10 connected between the side rod 8 of the cutter holder 5 and a rear part of the housing 1, a handgrip 2 fixedly connected to the housing 1 at a bottom side, a lever 3 pivoted to the housing 1 in front of the handgrip 2, a compression spring 4 connected between the lever 3 and the handgrip 2, and a ratchet mechanism a pivoted to the lever 3 below the rack 7 of the cutter holder 5. The ratchet mechanism a comprises a ratchet wheel 11 meshed with the rack 7 of the cutter holder 5 and rotated to move the cutter holder 5 forwards or backwards, a stop block 13 mounted on the lever 3, a push block 12 pivoted to the lever 3 and supported on a spring 14 in the lever 3, a pawl 15 pivoted to the housing 1 and adapted to limit the direction of rotation of the ratchet wheel 11, and a control rod 16 adapted to release the pawl 15 from the ratchet wheel 11. When alternatively pressing and releasing the lever 3, the push block 12 is forced to rotate the ratchet wheel 11, thereby causing the ratchet wheel 11 to move the cutter holder 5 forwards, and therefore the cutter 6 cuts the loaded plastic pipe 9. During cutting, the pawl 15 stops the ratchet wheel 11 from reverse rotation. After cutting, the control rod 16 is pushed forwards to disengage the pawl 15 from the ratchet wheel 11, enabling the cutter holder 5 to be pulled back by the tensile spring 10. This structure of plastic pipe cutting device is still not satisfactory in function. The drawbacks of this structure of plastic pipe cutting device are outlined hereinafter.

1. Because driving force is transmitted from the lever 3 to the rack 7 of the cutter holder 5 through the push block 12 and the ratchet wheel 11, much effort is required to move the cutter holder 5.
2. The ratchet wheel 11 wears quickly with use. When started to wear, the ratchet wheel 11 may slip on the rack 7 of the cutter holder 5.
3. The pawl 15 wears quickly with use, and tends to slip on the ratchet wheel 11. Further, the control rod 16 may be driven accidentally to disengage the pawl 15 from the ratchet wheel 11.
4. The cutter holder 5 can be pulled back only after the control rod 16 had been pressed to disengage the pawl 15 from the ratchet wheel 11. If the user forgets to disengage the pawl 15 from the ratchet wheel 11 for enabling the cutter holder 5 to be pulled back by the tensile spring 10, the cutter 6 is not received inside the housing 1 and may injure the people by an accident.

SUMMARY OF THE INVENTION

The invention has been accomplished to provide a plastic pipe cutting device, which eliminates the aforesaid drawbacks. It is one object of the present invention to provide a plastic pipe cutting device, which can be operated with less effort to cut the loaded plastic pipe efficiently. It is another object of the present invention to provide a plastic pipe cutting device, which automatically pulls the cutter back to the stand-by position after each cutting operation. It is still another object of the present invention to provide a plastic pipe cutting device, which drives the cutter positively without a miss. It is still another object of the present invention to provide a plastic pipe cutting device, which is safe in use. According to one aspect of the present invention, the plastic pipe cutting device comprises a housing, a cutter connected to a tensile spring at a rear side in the housing and adapted for cutting a plastic pipe inserted into the housing, a lever pivoted to the housing and adapted to drive the cutter, a driving block supported on a spring in the lever and adapted for turning with the lever to move the cutter forwards, a stop member adapted to stop the cutter from backward movement, and a push block slidably mounted in the housing and adapted to push the stop member away from the cutter for enabling the cutter to be automatically pulled back by the tensile spring to its stand-by position after the loaded plastic pipe had been cut. According to another aspect of the present invention, the driving block is driven to move the cutter directly when alternatively pressing down and then releasing the lever. According to still another aspect of the present invention, the rack of the cutter is formed of a series of teeth sloping in one direction, therefore the driving block does not slip on the rack when turned with the lever to move the cutter. According to still another aspect of the present invention, the stop member stops the cutter from backward movement during forward cutting operation, preventing the occurrence of an accident.

DETAILED DESCRIPTION OF THE PREFERRED EMBODIMENT

Figure 1:
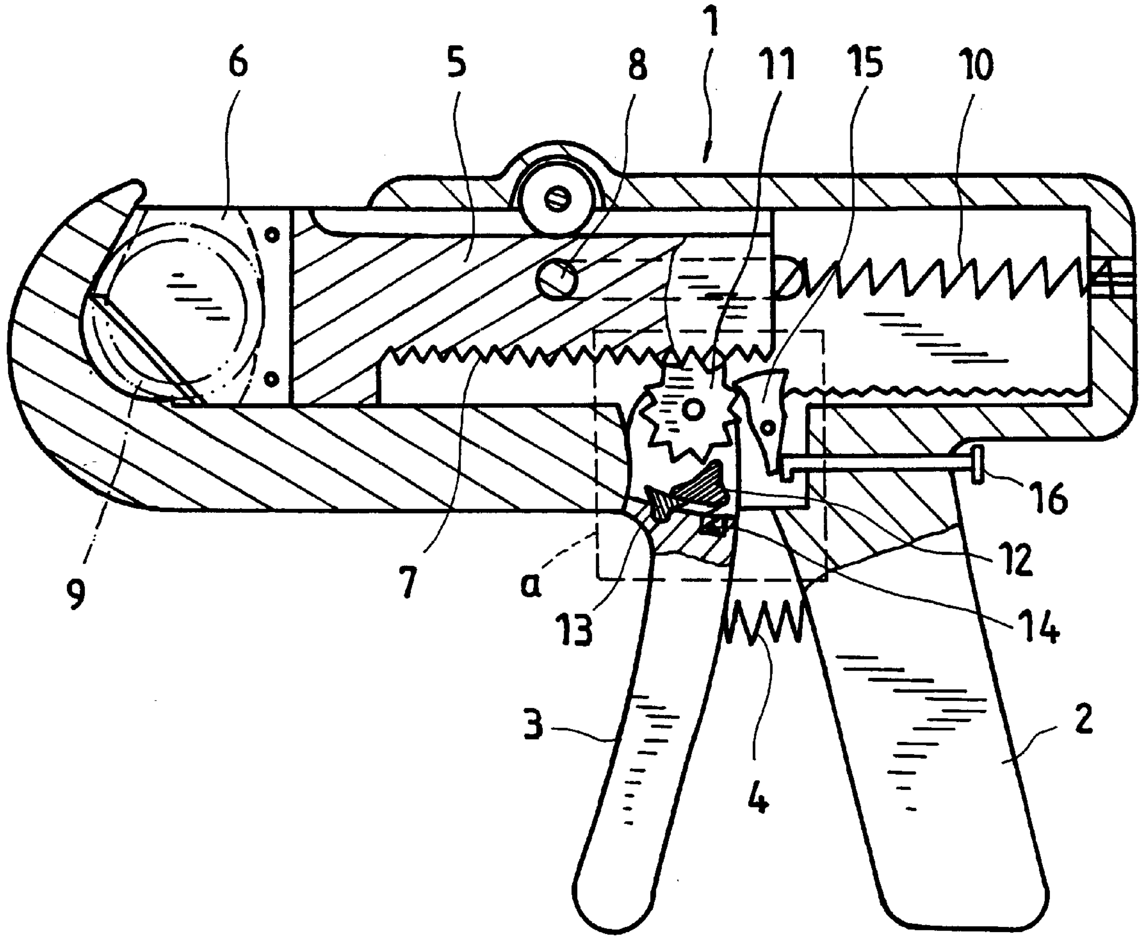
FIG.1 PRIOR ART
FIG. 1 is a sectional view of a plastic pipe cutting device according to the prior art.
Figure 2:
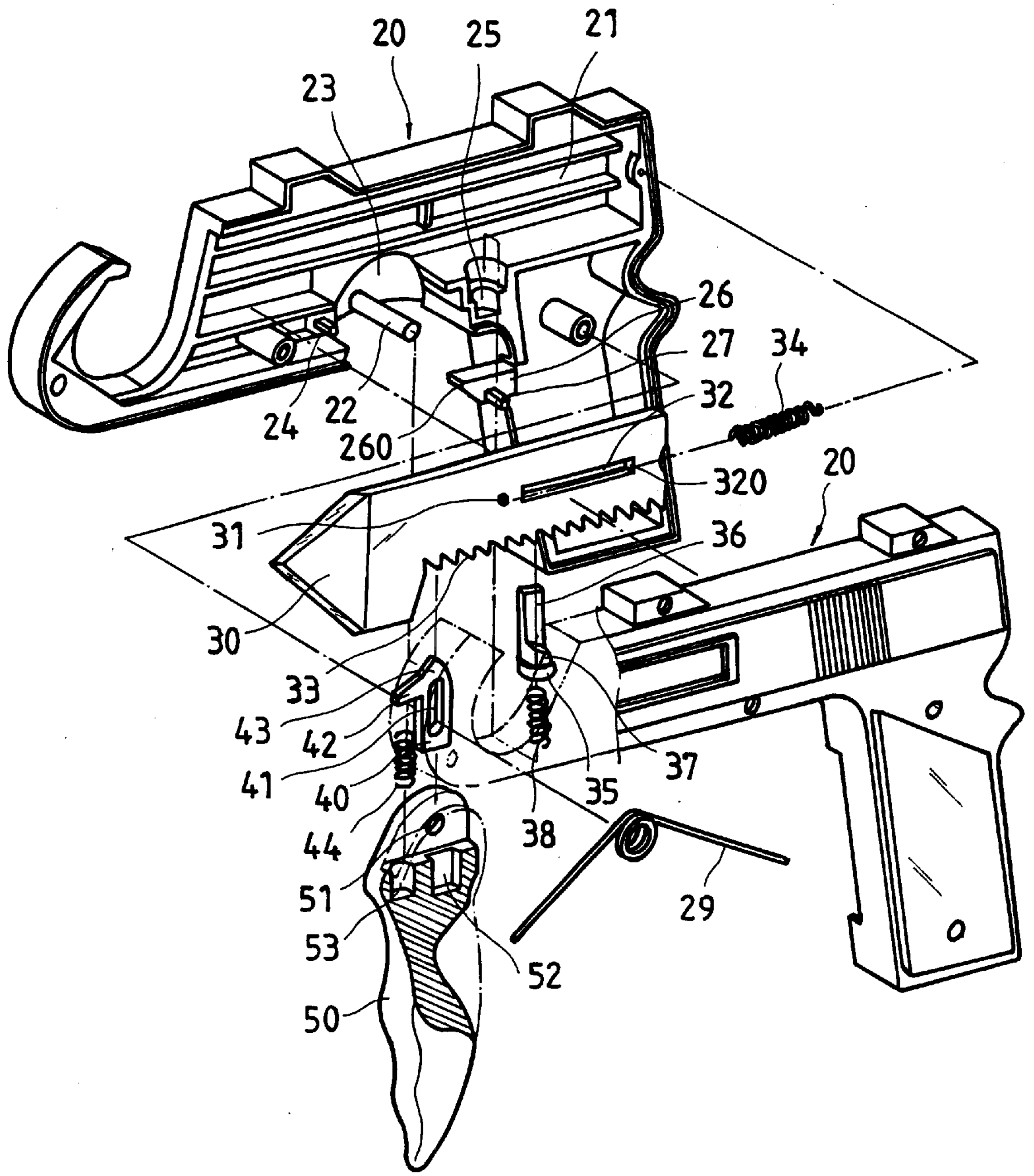
FIG. 2 is an exploded view of a plastic pipe cutting device according to the present invention.
Figure 3A:
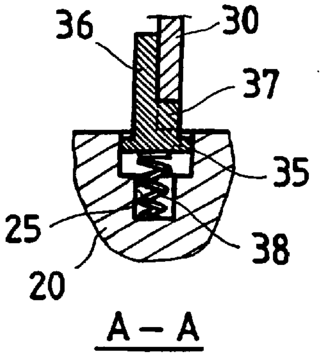
FIG. 3A is sectional view in an enlarged scale taken along line A—A of FIG. 3.
Figure 3:
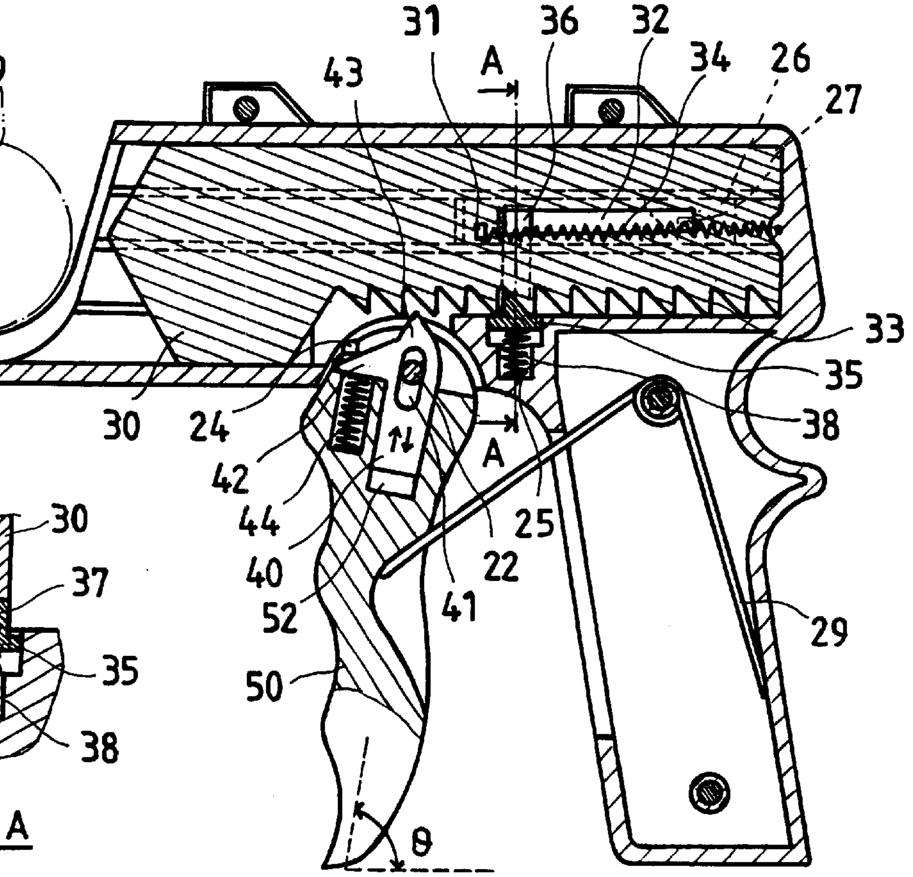
FIG. 3 is a front view in section of the present invention before operation.
Figure 4:
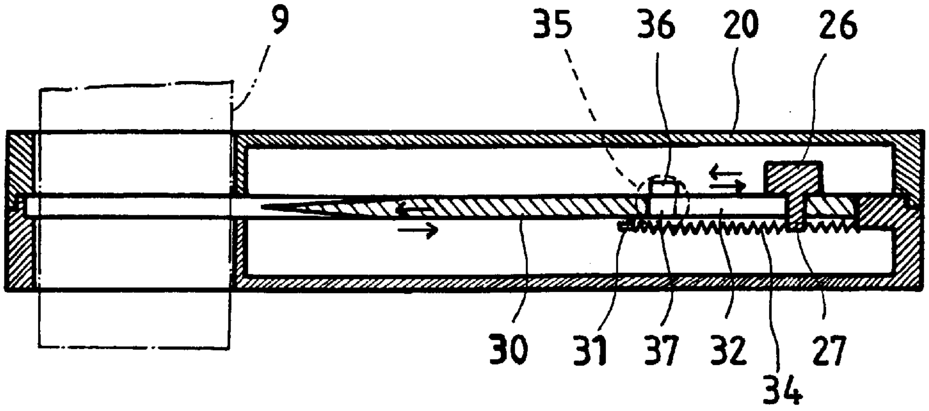
FIG. 4 is top view in section of the plastic pipe cutting device according to the present invention.

Referring to FIGS. 2, 3 and 4, a plastic pipe cutting device in accordance with the present invention is generally comprised of a housing 20, a lever 50, and a cutter 30. The housing 20 comprises a bottom open chamber 23, a fixed rod 22 suspended in the bottom open chamber 23 and adapted to hold the lever 50. The lever 50 has a pivot hole 51 disposed at its one end and coupled to the fixed rod 22. A torsional spring 29 is mounted inside the housing 20, having two opposite ends respectively connected to a part of the housing 20 and a part of the lever 50. The cutter 30 is slidably mounted in the housing 20, having a stub rod 31 on the middle. A tensile spring 34 is mounted inside the housing 20 and connected between the stub rod 31 of the cutter 30 and a rear part of the housing 20.

Referring to FIGS. from 2 through 4 again, the cutter 30 comprises a rack 33 formed of a series of sloping teeth and longitudinally extended at the bottom side thereof, and a longitudinal sliding slot 32 spaced between the stub rod 31 and the rear end thereof. The housing 20 comprises a longitudinal sliding groove 21 corresponding to the longitudinal sliding slot 32 of the cutter 30, a receiving chamber 25 disposed behind the bottom open chamber 23 and below the longitudinal sliding groove 21, and a protruded block 24 suspended at a front side of the bottom open chamber 23. A push block 26 is slidably mounted in the longitudinal sliding groove 21 inside the housing 20, comprising a beveled front face 260, and a push rod 27 perpendicularly extended from one side wall thereof and inserted into the longitudinal sliding slot 32 of the cutter 30. The receiving chamber 25 holds a compression spring 38 and a stop member 35 on the compression spring 38. The stop member 35 comprises an upright rod 36 stopped at the beveled front face 260 of the push block 26, and a pawl 37 meshed with the rack 33 of the cutter 30. The lever 50 comprises a top sliding hole 52 and a top receiving hole 53. A compression spring 44 is mounted in the top receiving hole 53. A driving block 40 is mounted in the top sliding hole 52 of the lever 50 and supported on the compression spring 44. The driving block 40 comprises a longitudinal sliding slot 41 coupled to the fixed rod 22, a sloping plate 42 supported on the compression spring 44, and a top tooth 43 adapted for engaging the rack 33 of the cutter 30.

Referring to FIGS. 3 and 4, at the initial stage, the cutter 30 is pulled by the tensile spring 34 and disposed at the rear side, the stop member 35 is pushed upwards by the compression spring 38 to force the pawl 37 into engagement with the rack 33 of the cutter 30, the lever 50 is supported on the torsional spring 29 and kept in a tilted angle θ to hold the driving block 40 in a tilted position away from the rack 33 of the cutter 30.

Figure 5:
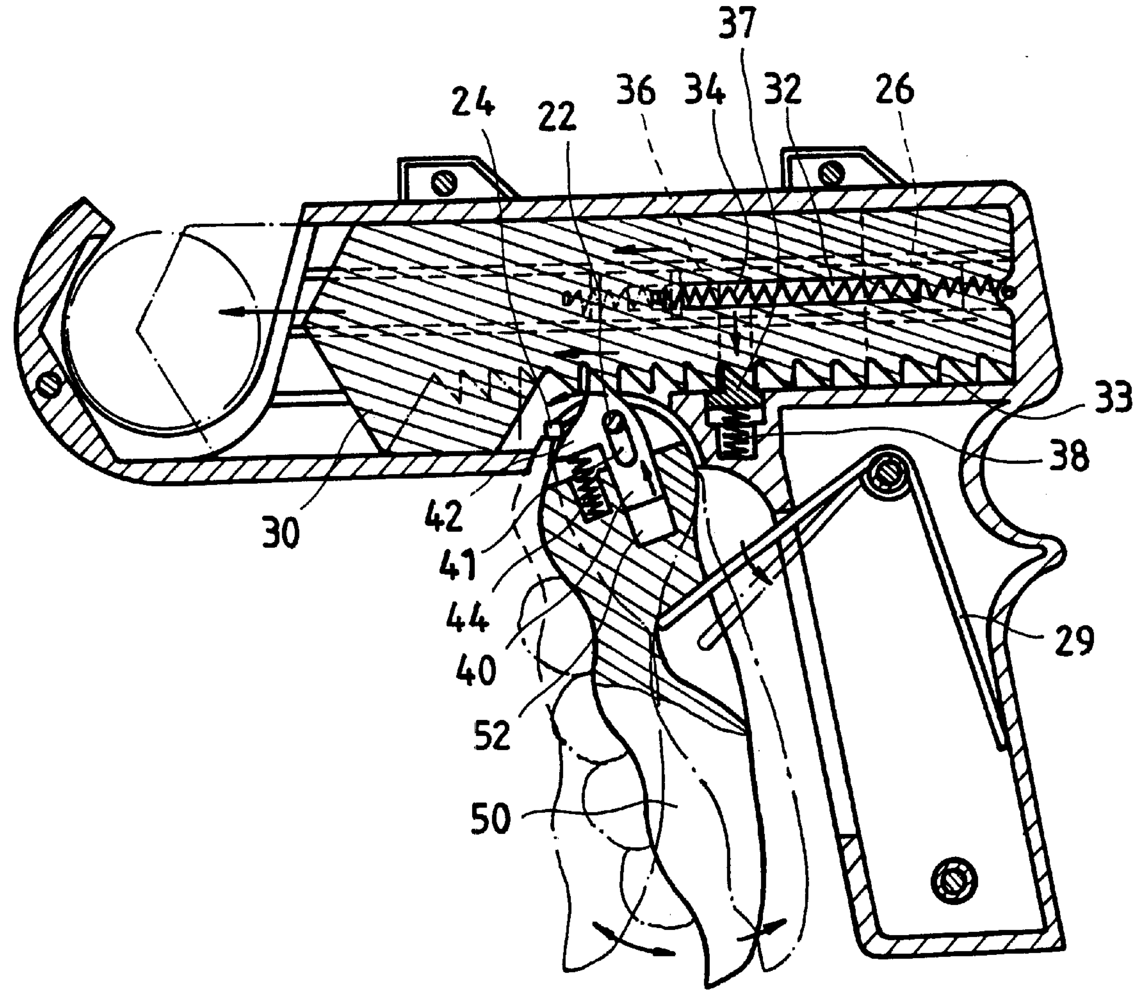
FIG. 5 is similar to FIG. 3 but showing the lever pressed down, the cutter moved forwards.

Referring to FIG. 5 and FIGS. 3 and 4 again, after a plastic pipe 9 had been put in the housing 20 for cutting, the lever 50 is pressed down (turned rightwards) to move the driving block 40 over the protruded block 24, enabling the top tooth 43 of the driving block 40 to be forced by the compression spring 44 into engagement with the rack 33 of the cutter 30. When continuously pressing down the lever 50 after engagement of the top tooth 43 of the driving block 40 with the rack 33 of the cutter 30, the cutter 30 is forced forwards by the driving block 40 for one step (equivalent to the thickness of one tooth of the rack 33 of the cutter 30). When releasing the lever 50, the cutter 30 is stopped from backward movement by the pawl 37 of the stop member 35. By means of alternatively pressing down the lever 50 and then releasing it, the cutter 30 is driven to cut through the plastic pipe 9.

Figure 6A:
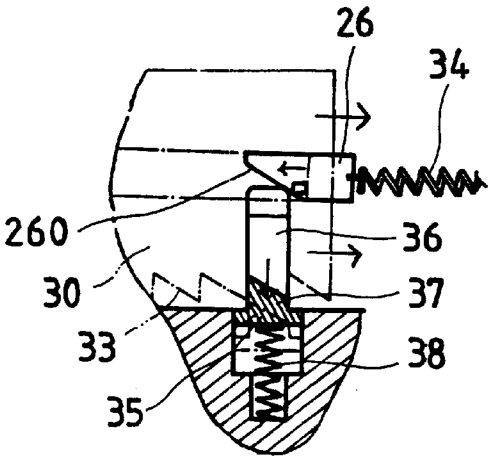
FIG. 6A is an enlarged view of a part of FIG. 6.
Figure 6:
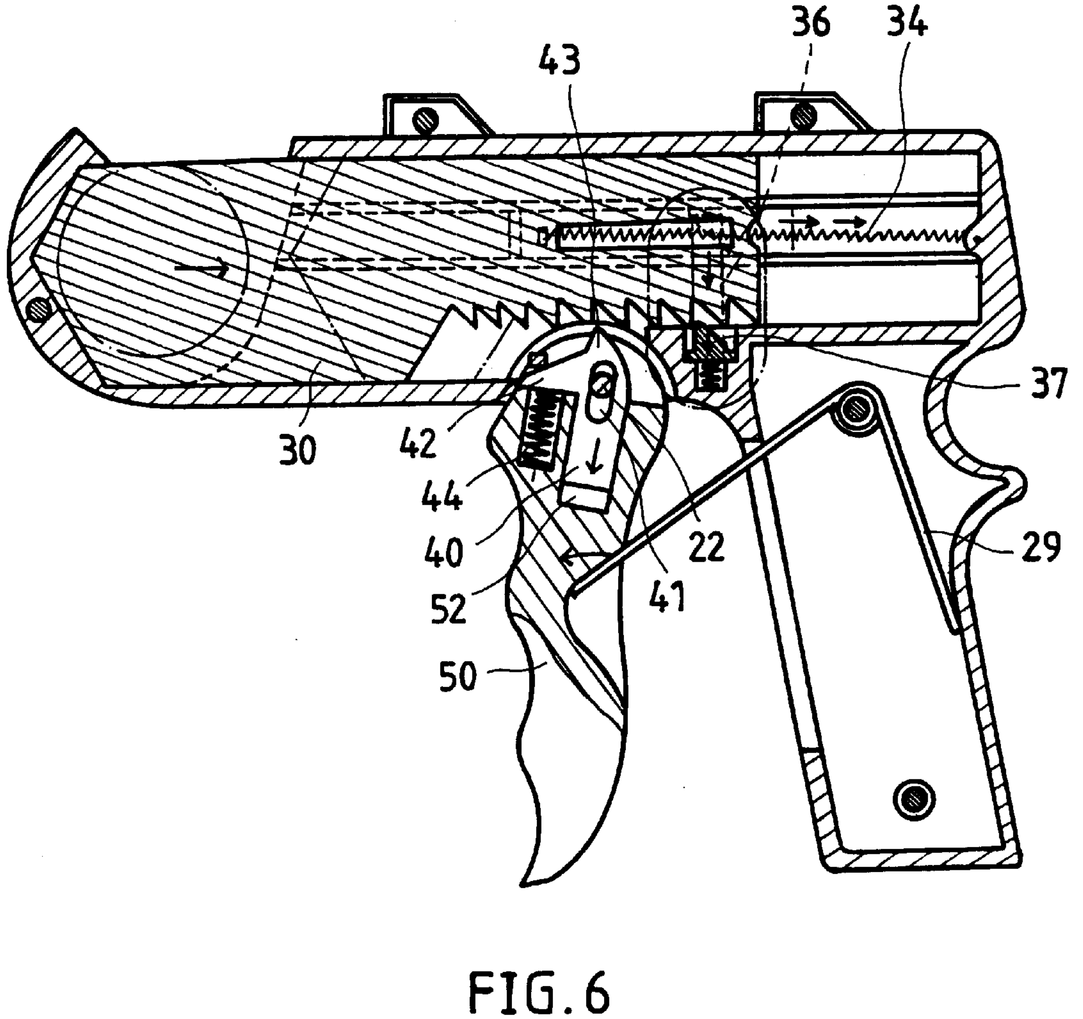
FIG. 6 is similar to FIG. 5 but showing the stop member disengaged from the rack of the cutter.

Referring to FIG. 6 and FIG. 2 again, after cutting, the cutter 30 and the push block 26 are moved to the front side, and the rear end edge 320 of the longitudinal sliding slot 32 of the cutter 30 gives a forward pressure to the push rod 27 of the push block 26, causing the push block 26 to force the stop member 35 downwards (because the beveled front face 260 of the stop member 26 is disposed in contact with the upright rod 36 of the stop member 35), and therefore the pawl 37 of the stop member 35 is disengaged from the rack 33 of the cutter 30. After disengagement of the pawl 37 of the stop member 35 from the rack 33 of the cutter 30, the cutter 30 is immediately pulled back to its former position at the back side in the housing 20 by the tensile spring 34.

What the invention claimed is:

1. A plastic pipe cutting device comprising a housing, said housing comprising a bottom open chamber and a fixed rod suspended in said bottom open chamber, a cutter slidably mounted in said housing, a lever pivoted to said fixed rod and extended out of said housing through said bottom open chamber for pressing by hand to move said cutter forwards in cutting a plastic pipe put in said housing, a torsional spring mounted in said housing and adapted to impart a forward pressure to said lever, a tensile spring mounted inside said housing and adapted to pull said cutter backwards, wherein said cutter comprises a rack formed of a series of sloping teeth and longitudinally extended at a bottom side thereof, and a longitudinal sliding slot spaced above said rack; said housing comprises a longitudinal sliding groove corresponding to the longitudinal sliding slot of said cutter, a receiving chamber disposed behind said bottom open chamber and below said longitudinal sliding groove; a push block is slidably mounted in the longitudinal sliding groove inside said housing, comprising a beveled front face, and a push rod perpendicularly extended from one side wall thereof and inserted into the longitudinal sliding slot of said cutter; a stop member is supported on a compression spring in said receiving chamber inside said housing, said stop member comprising an upright rod stopped at the beveled front face of said push block, and a pawl adapted for engaging the rack of said cutter to stop said cutter from backward movement; said lever comprises a top sliding hole and a top receiving hole; a compression spring is mounted in said top receiving hole of said lever and a driving block is mounted in the top sliding hole of said lever and supported on the compression spring in the top receiving hole of said lever and adapted for driving said cutter forwards upon operation of said lever, said driving block comprising a longitudinal sliding slot coupled to the fixed rod of said housing, a sloping plate supported on the compression spring in the top receiving hole of said lever, and a top tooth adapted for engaging the rack of said cutter.

2. The plastic pipe cutting device of claim 1 wherein said housing comprises a protruded block suspended in said bottom open chamber at a front side and disposed in contact with the sloping plate of said driving block for enabling said driving member to be moved with said lever in and out of engagement with the rack of said cutter.

* * * * *